United States Patent Office 2,991,243
Patented July 4, 1961

2,991,243
CUTTING COMPOUNDS CONTAINING FINELY DIVIDED METAL AND CHELATING AGENT
Harry A. Toulmin, Jr., Dayton, Ohio, assignor to The Commonwealth Engineering Company of Ohio, Dayton, Ohio, a corporation of Ohio
No Drawing. Filed Oct. 12, 1953, Ser. No. 385,700
4 Claims. (Cl. 252—26)

This invention relates to new compositions of matter and particularly to compositions especially adapted for use as cutting compounds during processing or working operations such as cutting, drilling, grinding, tapping, milling, drawing, metal-stamping and the like.

Numerous problems arise in connection with cutting compounds used in machining such metals as mild and stainless steels, steel alloys and cast iron. One such problem which arises in many cutting operations, such as those performed on lathes and drill presses, is the difficulty of keeping the cutting compound at the cutting point in spite of the continual flow of metal past that point. Without proper, continuous liquid flow at the cutting point, for instance if the cutting compound has weak film strength, or if it tends to drain away from the cutting point, there is a tendency for metal to build up on the cutting tool, and this hampers cutting. There is also the problem of friction accompanying a given cutting or other metalworking job and which increases with increase in speed, with the result that at high cutting speeds the heat generated is so intense that, in the event of metal-to-metal contact, the metals will tend to weld together, with inevitable scoring or tearing out of metal and the acquisition of a rough surface by the object being processed, shorter life of the tool, and/or reduced cutting speeds.

The most troublesome problem arises from the fact that, invariably, the metal pieces which have been cut or otherwise processed or worked, are left around the shop for rather extended periods of time, often as long as two or three weeks, before being assembled, and during that time are exposed to corrosive influences, including rusting as the result of perspiration transferred to the object during handling thereof by the shop personnel. Even very brief periods of time are sufficient for rusting to occur.

Although intensive investigations have been carried on in the search for an ideal cutting compound, and many types of cutting compounds have been proposed in the prior art, looking to the elimination of the aforementioned and other problems which beset the metal-working industry, the available cutting aids are defective in one respect or another. Either they lack sufficient film strength and tend to drain away from the area of contact between the tool and the part being machined, or they do not prevent build-up of metal chips on the tool, or they do not exhibit the high heat absorption essential for a high-speed cutting operation, or they are not strongly resistant to oxidation or atmospheric attack, or they afford no protection for the machined parts when they are laid aside temporarily awaiting assembly, and if corrosion is to be avoided during such period, special treatment of the part, separate from the cutting operation, is required.

In my application Serial No. 337,908, filed February 20, 1953, now Patent No. 2,829,430, there are described new cutting compositions comprising a particulate metal and a cutting fluid which is a vehicle for the metal. In these compositions, the metal is present in finely divided form, preferably in the form of particles having a diameter between 0.5 and 50 microns, and most desirably between 0.5 to 3.0 microns (sub-sieve determination). The finely divided metal is suspended in the cutting liquid in an amount between 5% and 150% by weight, and usually the concentration of the metal is rather heavy. An optimum composition comprises, illustratively, the cutting oil available commercially under the trade designation "S-1 Sohio" and about 35 gms. of the finely divided metal, such as commercial zinc dust, i.e., zinc having a particle diameter such that at least 90% of the particles pass a 400 mesh Tyler screen.

In these cutting compositions any appropriate finely divided metal may be used, including zinc, aluminum, titanium, magnesium, zirconium and lithium dust. The compositions will be discussed in detail in connection with those comprising zinc dust.

The fluid component of the new cutting compounds which also functions as a vehicle for the metal dust, may be water or an aqueous salt solution, e.g., an aqueous solution of soda ash or trisodium phosphate, provided that the composition also includes an agent which effectively inhibits corrosion of the zinc, especially if the composition is packaged.

Preferably, however, the fluid is oil or one of the so-called "water-mixes" or "soluble oils," i.e., emulsions obtained by dispersing oils in water with the aid of an emulsifying agent. For example, the fluid may be mineral oil, mixtures of mineral and lard oils, paraffin oil, lard oil, sperm oil, liquid silicones, mixtures of heavy sulfurized fatty oil and conventional grades of sulfurized mineral oil, etc. Or the fluid may be a mixture of water and oil.

These oil-water mixes or "soluble oils" represent a preferred embodiment of the invention. They have assumed major importance in the metal cutting art because, due to its high density, high specific heat, and low viscosity, the water serves as a potent heat-removing substance (i.e., the water is a positive coolant), while the oil provides the desired lubricity.

The cutting fluid preferably comprises oil, straight or mixed with water, not only because it is desirable to take advantage of its lubricating properties but also because oil facilitates even distribution of the finely divided zinc on the surface of the work-piece as the latter is being cut and assists in maintaining the zinc dust in the dispersed condition for protecting the piece against corrosion after it has been cut, as is explained in greater detail hereinafter.

It is found that these compositions have unexpected outstanding advantages for use as cutting compounds in metal-cutting, where it is necessary to maintain a thin, strong lubricating film between relatively moving faces or parts of the metal object being worked on and the tool.

When the compositions are applied to the area of contact, as by squirting through a nozzle attached to a reservoir associated with the machine in the usual way, the added zinc particles are subjected to both heat and pressure at the interface between the tool and the work.

Under the influence of the intense heat created, the metal expands and, under the high pressure exerted at the interface, the minute particles of ductile zinc metal are squeezed into the pores of the heat-expanded metal surface and thus penetrate into and below the surface of the metal piece being worked.

The natural electrical and physical affinities of zinc for steel or other metal are thus fully exerted, akin to galvanizing. It is significant that the area of maximum pressure coincides with that of maximum heat—at the working interface—constituting a powerful conjoint action to impress the zinc deeply into the pores of the metals while the latter are hot.

Accordingly, exceptional adhesion and uniform coverage of the zinc film are obtained on the work metal to afford unique resistance to corrosion or oxidation of the metal being cut.

Further, the cutting tool itself is afforded a measure of protection, though usually to a lesser degree in view of its greater hardness and surface density.

Moreover, the ductile film of zinc pressed into the surface of the metal serves to lubricate both active metal surfaces (tool and work) substantially to minimize friction that limits the speed of the machining operation. In other words, the tool is permitted to gouge out, crush, and sever chips or turnings from the work-piece with a minimum of heat-generating rubbing of hard tool metal directly on the work metal; there is invariably interposed a ductile film of zinc metal far more tenacious and durable than any oil or liquid emulsion alone. In other words, the energy of the tool is spent more effectively with zinc-containing preparations, on actual cutting or machining, rather than in purely frictional rubbing.

Accordingly, the use of these new cutting compounds comprising particulate metal such as zinc dust of the average particle size stated permits standard lubricating formulations to provide superior anti-friction surfaces for machining, to reduce the wear on tool, to speed up the operation, and to impart superior corrosion resistance to the work-piece.

The use of the composition comprising the oil or water-oil emulsion and particulate zinc affords an additional measure of control of the temperature at the area of contact between the metal faces or parts. The incorporation of the particulate zinc in the composition materially increases the apparent density of the oil or oil-water emulsion. Because of its increased mass, each degree rise in temperature of the cutting compound requires a larger number of calories than if the zinc dust were omitted, with the practical result that the compound can absorb and carry away an increased amount of heat without itself becoming hot and, therefore, in effect, the cutting compound of the invention functions to cool the metal, permitting continuous, high-speed cutting without overheating or danger of metal-to-metal contact and welding. The inherent ductility of the zinc, and the oily, slippery character of the finely divided particulate zinc are also assets, serving to enhance the natural lubricating properties of the oil or oil-water mixture.

The cutting compounds comprising the metal particles have the additional advantage that they form a rustproof finish or coating on the machined part which is long-lasting because the metal particles penetrate into the surface of the heat-expanded metal during the working.

It has been observed that application of a cutting compound containing the sub-micron metal dust as described herein to the area of contact between a cutting tool and a machine part comprising, for example, a mild steel, during cutting of the latter, resulted in a film or finish on the machined part which prevents rusting of the steel even when the part is exposed to the atmosphere in the shop for about three weeks.

Penetration of the metal particles into the heat-expanded metal during the working, and the resulting strong electrolytic or attractive force between the metal particles and the steel delays the onset of atmospheric changes because, while the finely divided metal, as for instance, zinc may be subject to ultimate deterioration when it is exposed to the atmosphere, it has a relatively high resistance to atmospheric attack and the deterioration proceeds very slowly, especially since the particles are imbedded in the metal piece.

No special after-treatment of the machined part with a protective anti-corrosion agent is required because the zinc-containing finish in and on the part, after the machining operation, has to be destroyed before corrosion of the part proper ensues and the time required for its destruction under the conditions normally prevailing in the shop is so long that the part will generally be assembled before there is any sign of rusting of the steel or the like.

Thus, by the use of the compositions described, the metal part is simultaneously machined and provided with a long-lasting rustproof finish in a single operation. Furthermore, the oily film carried by the part after it is machined presents no problem with respect to its removal from the part when the latter is to be assembled since, to all practical purposes, it can be removed very readily by simply wiping it off with a cloth.

The proportion of zinc or other particulate metal suspended in the cutting compound may be varied somewhat depending on the work to be done and the cutting compound used and may be between 5% and 150% by weight. Illustratively, cutting oils to be used during drilling operations preferably contain between 25% and 35% of submicron zinc particles (weight percent of oil) whereas concentrations of zinc dust around 150% are preferred when the composition is to be used during milling and the cutting compound is a water-soluble oil, i.e., water-oil mix.

The cutting compounds may be applied in various ways, as may be most convenient. The means for applying the cutting compound and the machine tool may be operated as a unit, the tool being designed with a built-in reservoir and circulating system, or the cutting compound may be pumped from a central station to the individual operating stations or to strategically located distributing centers.

As demonstrated in detail in the pending application in which these cutting compositions are described in detail, a substantial reduction of strain on the cutting tool results when the cutting is performed in the presence of the compositions comprising the metal dust. Also, the cut surfaces can be exposed to normal perspiration without showing rusting.

If, as is usually the case, the cutting composition is pumped from a reservoir to the cutting or working site, the action of the pump assists in maintaining the finely divided metal or dust in suspension in the cutting liquid vehicle. Also, when the vehicle is a straight oil and the metal particles have a diameter at or near the lower limit of the range 0.5 to 50 microns, the particles tend to remain in suspended condition. However, under some conditions, as when the pumping is interrupted, or when the compositions are allowed to stand, and especially when the concentration of metal dust is high, the metal particles tend to settle out.

The object of this invention is to provide improved cutting compositions comprising a cutting liquid having suspended therein finely divided metal, or metal dust, as described herein, and in which the metal particles remain suspended and do not tend to settle out on standing.

This and other objects are accomplished by the provision of improved, modified cutting compounds comprising, in addition to the cutting fluid and finely divided metal or metal dust, a chelating agent which has the effect of sequestering the metal particles to maintain them in a stabilized suspended condition in the vehicle. Five-membered and six-membered chelating agents or sequestrants are known and available and any of these may be used in the present compositions preferably in amounts of from 0.5 to 50% by weight.

Examples of suitable chelating substances for incorporation in the cutting compositions include ethylenediamine tetraacetic acid which is also referred to by the initials EDTA and a commercially available brand of which is marketed under the trade designation "Sequestrene"; synthetic polyamino polycarboxylic acids of the kind known commercially by the trade name "Versene," marketed by Versenes, Inc., Framingham, Mass., and amino carboxylic acids of the type available on the market under the trade designation "Nullagen." Chelating agents such as the commercial product "Trilon" may also be used.

These specific chelating agents are mentioned as illustrative and other compounds, such as, for example, oximes of the type of dimethyl glyoxime, which exhibit the chelating effect may be mixed with the cutting liquid and finely divided metal.

Incorporation of the chelating agent in these compositions has the effect of stabilizing the suspension so that settling out of the particulate metal, when the composition is at rest, as well as during circulation thereof to the working site, is inhibited or prevented. The chelating agent may be added, with stirring for uniform blending, to the mixture of cutting liquid and particulate metal.

The improved and stabilized cutting compositions may consist essentially of the cutting liquid, metallic particles, and chelating agent, or it may also include other substances which aid in retaining the finely divided metal in suspension.

The cutting compound may take the form of an oil-in-oil emulsion obtained by blending the oils, particulate metal and chelating agent in a conventional type mixer in the presence of suitable emulsifiers, detergents, or lubricity agents which facilitates the emulsification and may also serve to improve the lubricating properties of the oil, not only for the metal-working operation alone but also to promote slippage of zinc particles over one another to improve the lubricating property of the ductile zinc itself, and/or may serve to improve the correction resistance by wetting the metallic surfaces to afford more direct and intensive action of anti-corrosive agents and by affording more rapid removal of the corrosive products of highly heated oil at the work surface.

Specific adjuvants which may be used in preparing the emulsions include synthetic methyl esters of mixed fatty acids, such as the methyl ester of mixed oleic and palmitic acids marketed under the designation "Base ML" by Carlisle Chemical Works; sulfurized alkyl phenol metallic organic compounds such as Monsanto Chemical's "Santolube" 303-A, which contains about 4% barium and about 0.9% sulfur; dibenzyl disulfide; tritolyl phosphate and Monsanto's "Santocel ARD."

There may also be used fatty acid esters of polyhydric alcohols or ether alcohols, glycerol monosterate being illustrative; di- or tri-ethylene glycol or polyethylene glycol esters of fatty acids of the type of oleic acid; Turkey red oil; sperm oil; fatty esters of sugar alcohols such as the "Spans" (fatty acid partial esters of hexitol anhydrides) marketed by Atlas Powder Co.; higher fatty esters of pentaerythritol such as "Pentamul," a product marketed by Heyden Chemical Co.; the anti-corrosive and wetting agent marketed under the trade-name "Alox L-1727" by Alox Corporation; and the anti-corrosive agent marketed under the trade-name "X-rust 477" by Freedom-Valvaline Oil Co.

Mixtures of liquids which may be used in preparing the emulsions include mixtures of the sulfonated or unsulfonated wetting oils with glycols, glycerols, or esters thereof, including the monolaurates and monoricinoleates of the polyethylene glycols of molecular weight 400 and 600. Glyceryl monoricinoleate is especially satisfactory since, due to its surface activity, it permits an especially uniform dispersion of the zinc particles in the oil. The emulsifying agents may be used in comparatively small amounts sufficient to produce a satisfactory emulsion, and usually in amounts between 0.1% and 10% by weight.

The following examples illustrate specific embodiments of the invention in which the cutting composition comprises the cutting compound, zinc dust and a chelating agent.

*Example I*

A stable cutting composition is obtained by adding 10% by weight of the chelating agent "Sequestrene" (ethylenediamine tetraacetic acid) to the soluble oil Sohio E (a commercially available water-miscible petroleum sulfonate which is used in the present composition as a 1:20 aqueous emulsion) containing 10 gms. of zinc dust per 100 gms. of the soluble oil.

Holes ½-inch in diameter are drilled in a ¼-inch angle iron in the presence of the stabilized cutting composition, the ½-inch drill bit being operated at 800 r.p.m. The "Sequestrene," which inhibits settling out of the zinc dust, does not detract from the efficiency of the cutting composition or the protection it affords the drilled surface. The surface is just as resistant to corrosion on exposure to perspiration as are the same cutting compositions but which do not contain the chelating agent.

*Example II*

A stabilized cutting composition is obtained by blending about 12% of the chelating agent "Versene" FE-3 with the cutting oil S-1 Sohio (a commercially available sulfonated petroleum oil containing free sulfur) containing 35 gms. of zinc dust per 100 gms. of the oil.

Cuts ¾-inch long, ¼-inch wide and 5.0-mils deep may be made in a mild steel bar, with a horizontal milling machine, using the stabilized cutting compound as the cutting aid, to facilitate the cutting operation and leave on the milled piece a stable, protective anti-corrosive coating or film.

Although the cutting compound may consist of the metal particles, the oil or water-oil mix, and the chelating agent with, optionally, the addition of other adjuvants such as emulsifying and dispersing aids, the compositions may also comprise other substances which either contribute special qualities to the cutting composition or enhance the inherent properties thereof. It may comprise, for example, small amounts, such as between 2% and 10% by weight, of rust-inhibiting substances among which may be mentioned diphenylamide; higher fatty acid salts of dibenzylamine such as the oleate, palmitate or stearate; the phosphite ester of alkyd-phenols; dihexadecyl ketone, alkyl esters of malic acid containing more than six carbon atoms in the alkyl radical, such as the hexyl, cetyl, etc., esters; butylamine; and long chain aliphatic bifunctional diamines or diamides containing 6–20 carbon atoms and having terminal amino or amido groups which affix themselves to metal at the nitrogen atom and form a monomolecular protective film on the metal.

As typical of these last-mentioned nitrogenous anti-corrosion materials may be mentioned the product known as "Rodine," which is marketed by American Chemical Paint Co. All the foregoing and other like materials, which may be used alone or, when chemically compatible, in admixture, supplement the high corrosion-resistance of the zinc or other protective metal.

Other adjuvants may be added to the cutting compositions for other special purposes. Thus, a small quantity, say, between 2% and 10% by weight, of a wax or a mixture of waxes for improving or supplementing the lubricity of the film formed between the cutting tool and the metal part being cut may be included in in the composition.

Suitable waxes which may be used include carnauba, candelilla, ouricury, montan, oxidized petroleum waxes and mixtures with hydrocarbon waxes such as paraffin, and microcrystalline waxes.

The microcrystalline waxes are particularly valuable for addition to the cutting compositions of the invention and are preferably used in their naturally oily condition, without a de-oiling pre-treatment. The cutting composition may, in certain instances, consist of water or an aqueous salt solution, containing a dispersed wax, such as a dispersed microcrystalline wax, the metallic dust, and a chelating agent. Such compositions may also be further improved by the addition of strongly corrosion-resistant materials.

The improved cutting compositions of this invention, comprising the chelating agent, exhibit the unique advantage of the cutting compositions of similar constitution but from which the chelating agent is absent, plus the additional advantage that they are stable suspensions which do not present difficulties on standing or during cutting or other difficulties due to precipitation of the finely divided metal or dust from the oil or water-oil vehicle.

Like compositions which do not contain the chelating agent, the present compositions prolong the life of the cutting or working tool. Hardened steels have a tendency to work-harden, and in various operations, notably drilling or tapping operations, heavy pressures are required at the center of operation. This results in generally shortened tool life and, in some cases, necessitates scrapping of the tool because of local failure before the entire tool itself would normally have to be replaced. The same difficulty is encountered in other metal-working operations in which high pressures are required to separate the chip from the part being machined.

Use of the cutting compounds of the invention also eliminates the problem of rusting of the machined parts by perspiration deposited thereon in the course of handling the parts. Corrosion of the metal by perspiration may be attributed to the acids and salts present in the perspiration and, as is known, the composition varies from individual to individual.

Cutting compounds which may afford some protection against rusting when the machined parts are handled by one person may be ineffective when the parts are handled by a different person. However, when the present cutting compounds are used, the resistance offered to penetration of the perspiration to the metal of the machined part by the zinc particles adhered to and intimately associated with the part is such that rusting by normal perspiration is eliminated entirely or retarded to such an extent that the rust does not eat through the zinc to the machined part proper in the time which expires, under normal shop conditions, between the machining operation and assembly of parts.

The present compositions may be used in cutting or otherwise working various metals and is of particular utility in cutting objects comprising mild and stainless steels, alloys and cast iron.

The metal dust-containing compounds or compositions described herein also have particular usefulness as cooling lubricants for combined crush and surface grinding operations. In that type of operation, the grinding tool is dressed periodically by crush-grinding to maintain its shape for subsequent, accurate surface-grinding of a large number of work-pieces.

Heretofore, each of these operations, crush-grinding and surface-grinding, has required treatment with a different composition. Oil alone has been required for crush grinding, because the pressures encountered are excessive for oil-water emulsions. However, oil alone has proved unsatisfactory for use in high-speed surface-grinding operations since it lacks the cooling capacity of compositions comprising water. Oil-water emulsions have been used for surface-grinding.

This use of two different treating agents entailed duplication of equipment for their application, or the trouble of changing and flushing the agents.

This problem is solved by the instant invention. The present cutting compounds comprising either oil or oil-water emulsions, metallic, more particularly zinc, dust and chelating agent for "gripping" or buoying up the said particles to hold them in suspension are adapted to use in both crush-grinding and surface-grinding.

The presence of the zinc dust in oil-type compounds adds heat-transfer capacity which keeps the work cool, in the manner of an oil-water emulsion, permitting use of the compound in both surface and crush-grinding. The presence of the zinc dust in oil-water emulsions not only increases the cooling and lubricating capacity of the oil-water emulsions but also provides the body and resistance to pressure, normally lacking in oil-water emulsions, which adapts the compounds to use in crush-grinding.

Furthermore, the film of particulate metal impressed into the heat-expanded surfaces of the work-piece imparts thereto the invaluable property of corrosion-resistance. Thus, the present oil or oil-water-based compositions or compounds containing zinc dust or the like can be used for the dual purpose of crush-grinding and surface-grinding.

It will be understood that the term "cutting compound" as used herein is intended to define compounds for use in cutting, grinding, tapping and other similar metal-working operations.

The invention has been discussed in detail in connection with cutting compounds and the working of metal in the presence of the metal dust-containing compositions. It will be obvious that, in its broader aspects, the invention involves a method of impregnating metal, particularly heat-expanded metal, with fine metal particles or dust by treating the metal with compositions comprising the metal particles and particularly by pressing compositions comprising metal particles into the base metal, most desirably while the base metal is in heat-expanded condition, whether the heating and pressing are developed as a result of a working, e.g., cutting, operation or not.

It will be understood that variations and modifications may be made in the compositions described herein without departing from the invention or the spirit and scope of the appended claims.

I claim:
1. A composition to be interposed between a metal base and a metal working tool during working of the metal base with said tool, to prevent overheating of the metal and welding of the base and tool while simultaneously providing the metal base with a permanent rustproof finish which is seemingly continuous with the surface of the base, said composition consisting essentially of an oil-in-water emulsion containing from 5% to 150% by weight of particles of a metal selected from the group consisting of zinc, aluminum, titanium, magnesium, zirconium and lithium having a diameter between 0.5 and 50 microns (sub-sieve determination) and an amount of ethylenediamine tetra-acetic acid sufficient to hold the metal particles in stable suspension in the cutting compound.

2. A composition to be interposed between a metal base and a metal working tool during working of the metal base with said tool, to prevent overheating of the metal and welding of the base and tool while simultaneously providing the metal base with a permanent rustproof finish which is seemingly continuous with the surface of the base, said composition consisting essentially of an oil-in-water emulsion containing, from 5% to 150% by weight of zinc particles having a diameter between 0.5 and 50 microns (sub-sieve determination) and an amount of ethylenediamine tetra-acetic acid sufficient to hold the metal particles in stable suspension in the cutting compound.

3. A composition to be interposed between a metal base and a metal working tool during working of the metal base with said tool, to prevent overheating of the metal and welding of the base and tool while simultaneously providing the metal base with a permanent rustproof finish which is seemingly continuous with the surface of the base, said composition consisting essentially of an oil-in-water emulsion containing from 5% to 150% by weight of zinc particles having a diameter between 0.5 and 50 microns (sub-sieve determination) and an amount of ethylenediamine tetra-acetic acid sufficient to hold the metal particles in stable suspension in the cutting compound.

4. A composition to be interposed between a metal base and a metal working tool during working of the metal base with said tool, to prevent overheating of the metal and welding of the base and tool while simultaneously providing the metal base with a permanent rustproof finish which is seemingly continuous with the surface of the base, said composition consisting essentially of a cutting compound which consists essentially of an oil-in-water emulsion containing from 5% to 150% by weight of zinc particles having a diameter between 0.5 and 50 microns (sub-sieve determination) and an amount of ethylenediamine tetra-acetic acid sufficient to hold the metal particles in stable suspension in the cutting compound.

References Cited in the file of this patent

UNITED STATES PATENTS

| | | |
|---|---|---|
| 1,810,905 | Carter | June 23, 1931 |
| 1,913,953 | Prendergast et al. | June 13, 1933 |
| 2,065,247 | Smith | Dec. 22, 1936 |
| 2,205,990 | Nelson | June 25, 1940 |
| 2,563,588 | Dixon | Aug. 7, 1951 |

OTHER REFERENCES

"Sequestrene," publication of Alrose Chemical Company; Providence, R.I., July 25, 1952, pages 27 and 28.